US008103280B2

(12) United States Patent
Austin et al.

(10) Patent No.: US 8,103,280 B2
(45) Date of Patent: *Jan. 24, 2012

(54) WIRELESS FREQUENCY RE-USE DETERMINATION SYSTEMS AND METHODS

(75) Inventors: Mark Austin, Atlanta, GA (US); Dock J. Latiolais, Rosharon, TX (US); Derek Johnson, Smyrna, GA (US); Ali Jabbary, Roswell, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 728 days.

This patent is subject to a terminal disclaimer.

(21) Appl. No.: 11/868,954

(22) Filed: Oct. 8, 2007

(65) Prior Publication Data

US 2008/0049664 A1 Feb. 28, 2008

Related U.S. Application Data

(60) Continuation of application No. 11/609,348, filed on Dec. 12, 2006, now Pat. No. 7,280,814, which is a continuation of application No. 10/936,155, filed on Sep. 8, 2004, now Pat. No. 7,149,479, which is a division of application No. 10/085,863, filed on Feb. 27, 2002, now Pat. No. 7,123,893.

(60) Provisional application No. 60/286,150, filed on Apr. 24, 2001.

(51) Int. Cl.
*H04W 40/00* (2009.01)
*H04W 72/00* (2009.01)
*H04W 24/00* (2009.01)

(52) U.S. Cl. .................. 455/447; 455/424; 455/453

(58) Field of Classification Search .............. 455/67.11, 455/67.14, 561, 436–443, 524–525, 422.1, 455/423–425, 445–453
See application file for complete search history.

(56) References Cited

U.S. PATENT DOCUMENTS

| 4,281,413 | A   |   | 7/1981  | Forrest         |           |
|-----------|-----|---|---------|-----------------|-----------|
| 5,412,658 | A   |   | 5/1995  | Arnold et al.   |           |
| 5,491,837 | A   |   | 2/1996  | Haartsen        |           |
| 5,790,952 | A   | * | 8/1998  | Seazholtz et al.| 455/432.1 |
| 5,794,146 | A   | * | 8/1998  | Sevcik et al.   | 455/434   |
| 5,875,180 | A   | * | 2/1999  | Wiedeman et al. | 370/320   |
| 6,137,991 | A   | * | 10/2000 | Isaksson        | 455/67.11 |
| 6,285,874 | B1  |   | 9/2001  | Magnusson et al.|           |
| 6,370,356 | B2  | * | 4/2002  | Duplessis et al.| 455/63.3  |
| 6,385,454 | B1  | * | 5/2002  | Bahl et al.     | 455/450   |
| 6,490,442 | B1  |   | 12/2002 | Billon          |           |
| 6,496,700 | B1  | * | 12/2002 | Chawla et al.   | 455/435.2 |

(Continued)

OTHER PUBLICATIONS

Notice of Allowance dated Sep. 21, 2006 for U.S. Appl. No. 10/936,155, 10 pages.

(Continued)

*Primary Examiner* — Brandon Miller
(74) *Attorney, Agent, or Firm* — Turocy & Watson, LLP

(57) ABSTRACT

A method of measuring frequency interference between adjacent cell sites in a wireless telecommunications system. The method includes selecting a frequency in a cell site to be used as a beacon frequency. The method also includes activating the beacon frequency in the cell site and recording, at a telecommunications switch, a signal strength of the beacon frequency as measured by a first wireless device operating in the cell site and a signal strength of the beacon frequency as measured by a second wireless device operating in another cell site. The method further includes determining the frequency interference between the cell site and the other cell site based on the signal strengths.

20 Claims, 2 Drawing Sheets

U.S. PATENT DOCUMENTS

| | | |
|---|---|---|
| 6,597,927 B1 | 7/2003 | Eswara et al. |
| 6,606,494 B1 * | 8/2003 | Arpee et al. ............... 455/422.1 |
| 6,611,500 B1 | 8/2003 | Clarkson et al. |
| 6,728,540 B1 | 4/2004 | DeSantis et al. |
| 6,842,431 B2 | 1/2005 | Clarkson et al. |
| 6,954,481 B1 | 10/2005 | Laroia et al. |
| 6,961,303 B1 | 11/2005 | Binder |
| 7,095,983 B1 * | 8/2006 | Austin et al. ............... 455/67.11 |
| 7,123,893 B1 * | 10/2006 | Austin et al. ............... 455/278.1 |
| 7,149,479 B2 * | 12/2006 | Austin et al. ............... 455/67.11 |
| 7,194,260 B1 * | 3/2007 | Jabbary et al. ................ 455/423 |
| 7,280,814 B2 * | 10/2007 | Austin et al. ............... 455/278.1 |
| 7,385,953 B2 * | 6/2008 | Ho et al. ....................... 370/330 |
| 7,702,285 B2 * | 4/2010 | Austin et al. ............... 455/67.11 |
| 2002/0044614 A1 * | 4/2002 | Molnar et al. ................ 375/346 |
| 2002/0077151 A1 | 6/2002 | Matthews et al. |

OTHER PUBLICATIONS

OA mailed Apr. 21, 2006 for U.S. Appl. No. 10/936,155, 10 pages.
OA mailed Mar. 9, 2006 for U.S. Appl. No. 10/085,863, 11 pages.
OA mailed May 4, 2005 for U.S. Appl. No. 10/085,863, 9 pages.
OA mailed Nov. 3, 2005 for U.S. Appl. No. 10/085,863, 11 pages.

* cited by examiner ated by a first wireless device operating in the cell site and a signal strength of the beacon frequency as measured by a second wireless device operating in the other cell site.

WIRELESS FREQUENCY RE-USE DETERMINATION SYSTEMS AND METHODS

CROSS REFERENCE TO RELATED APPLICATIONS

This application is a continuation of U.S. patent application Ser. No. 11/609,348 entitled WIRELESS FREQUENCY RE-USE DETERMINATION SYSTEMS AND METHODS, filed on Dec. 12, 2006 now U.S. Pat. No. 7,280,814, which is hereby incorporated by reference in its entirety, which is a continuation of U.S. patent application Ser. No. 10/936,155, filed on Sep. 8, 2004 now U.S. Pat. No. 7,149,479, which is a divisional of U.S. application Ser. No. 10/085,863, filed on Feb. 27, 2002 now U.S. Pat. No. 7,123,893 and claims priority under 35 U.S.C. §119(e) to U.S. Provisional Application Ser. No. 60/286,150 filed Apr. 24, 2001.

BACKGROUND OF THE INVENTION

There are various methods used to characterize the quality impact of reusing a frequency in a given sector or cell site with respect to all other sectors (cell sites) in a cellular or mobile communication system ("system"). Criteria available for making this judgment include C/I (Carrier/Interference) histograms, Bit Error Rate analysis, Mean Opinion Score (voice quality analysis), and engineering intuition. Oftentimes engineers use some combination of the aforementioned methods.

C/I measurements may be collected via drive testing (i.e., measuring signal strengths while actually driving around through different cell sites), propagation tools (i.e., measuring signal strength using a computer at a central location), or from a switch (i.e., using a mobile switching center (MSC) and the cell phones communicating with that MSC to determine signal strengths). Drive testing is resource-intensive and propagation tools may be prone to error, especially, for example, in heavily-populated urban areas.

SUMMARY OF THE INVENTION

The present invention is directed to, in one embodiment, a method of measuring frequency interference between adjacent cell sites in a wireless telecommunications system. The method includes selecting a frequency in a cell site to be used as a beacon frequency. The method also includes activating the beacon frequency in the cell site and recording, at a telecommunications switch, a signal strength of the beacon frequency as measured by a first wireless device operating in the cell site and a signal strength of the beacon frequency as measured by a second wireless device operating in another cell site. The method further includes determining the frequency interference between the cell site and the other cell site based on the signal strengths.

The present invention is also directed to, in another embodiment, a telecommunications system. The system includes a telecommunications switch for selecting a frequency in a cell site to be used as a beacon frequency, removing the beacon frequency from availability for use in the system by wireless device users, and activating the beacon frequency in the cell site. The system also includes a computer in communication with the switch for determining a frequency interference between the cell site and another cell site based on signal strength data resident on the switch, wherein the signal strength data include a signal strength of the beacon frequency as measured by a first wireless device

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figures 1, 2:
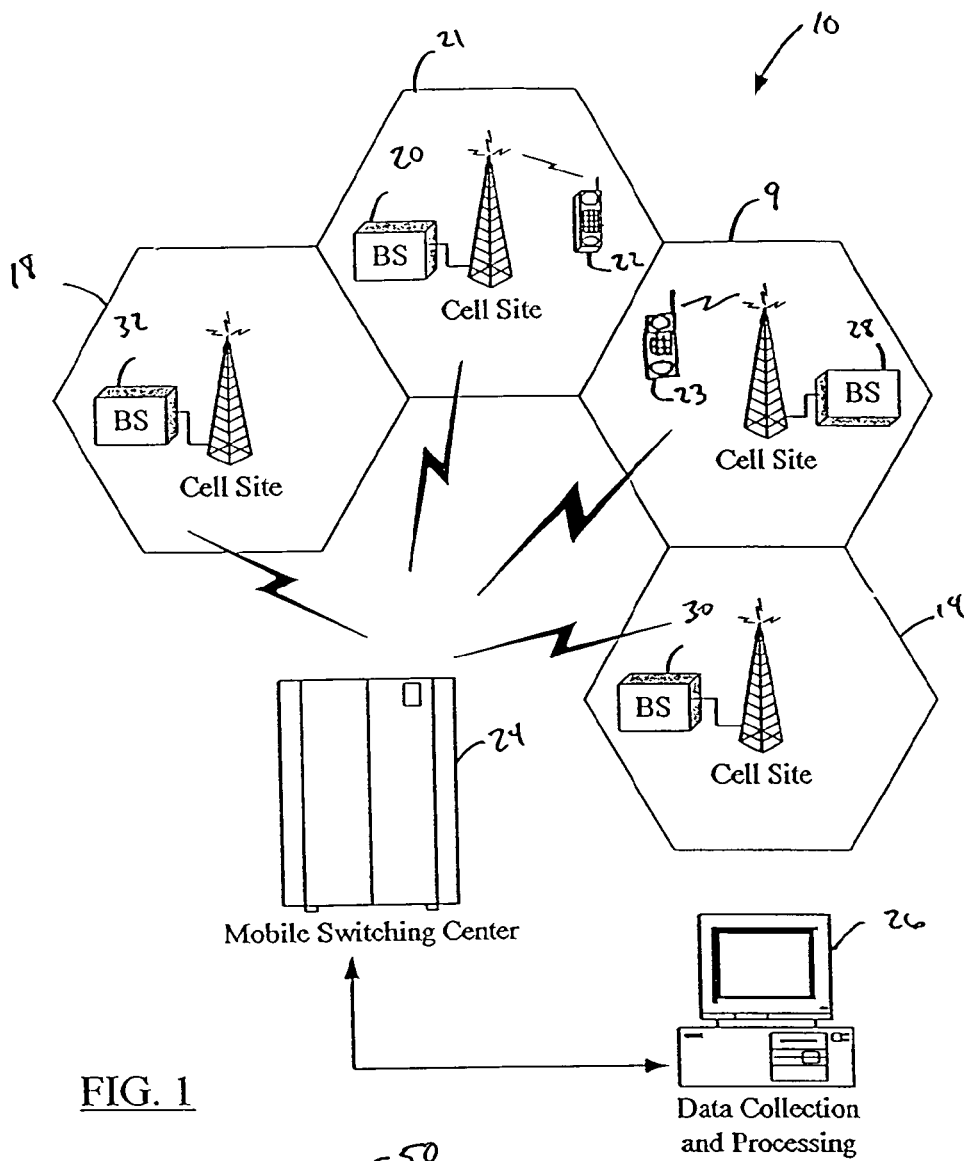
FIG. 1 illustrates an exemplary system that can be used to determine C/I estimates among various sectors or cell sites in the system.
FIG. 2 illustrates an exemplary C/I matrix.

FIG. 1 illustrates an exemplary system 10 used to determine C/I estimates among various sectors or cell sites 9, 14, 18, 21 in the system 10. Each cell site 9, 14, 18, 21 has an associated base station 28, 30, 32, 20, respectively, associated with it. The sites 9, 14, 18, 21 are in communication with a telecommunications switch such as a mobile switching center (MSC) 24. The MSC 24 is in communication with a computer 26 via, for example, a network such as a local area or wide area network or the Internet.

According to the present invention, a process is developed to collect downlink data from the system 10 in a manner that can be used to form C/I estimates between all sectors 9, 14, 18, 21 in the system. The term "downlink" signifies that a base station 20 transmits a signal to a mobile phone 22 that measures the signal strength and reports the observed strength back to the corresponding cell site 21. On the other hand, in an "uplink"-based system, the mobile 22 transmits to the base station 20, which then measures the signal strength. It is noted that uplinking and downlinking are not reciprocal. In other words, measurements performed with uplinking may not necessarily be identical or similar to those performed with downlinking. However, the overall quality of C/I estimates may be improved if signal measurements are performed via downlinking. Uplinking may be a relatively better process, and therefore it may be desirable to perform the computations with downlinking because that takes into account distortions or signal loss encountered in downlinking. One example of why downlinking can be worse than uplinking is because of the "slots" or divisions of a voice channel in 30 kHz segments. Whenever one slot is on, whether or not there are users on the other two slots/segments in the channel, the power stays up on the remaining slots also. There is no per-slot power control. Therefore, there is more unnecessary interference in downlinking than that in uplinking. Also, a mobile phone may be accessed at full power in uplinking, whereas the downlink system may be operating at less than the maximum power with substantial interference present.

It is noted that every mobile reports signal strength measurements of every site in its mobile assisted handoff (MAHO) list. Thus, under the present invention, the C/I between the current cell 21 and another cell, e.g. cell 9, (which is referred to hereinbelow as the "phantom cell" or the "phantom site") is estimated by keying up (i.e., powering up or turning on) a unique frequency in the phantom site 9, and adding this frequency to the MAHO list of the current cell 21. If each cell in the network adds this unique frequency to its respective MAHO list and enough MAHO reports are collected, the C/I between the phantom site 9 and every other cell in the system 10 can be characterized. By rotating this unique frequency throughout the whole system and selecting each and every other site sequentially to be the phantom site, the entire signal interference relationship for the whole system 10 can be obtained.

An exemplary C/I matrix 50 is illustrated in FIG. 2. The matrix 50 may be constructed using the method outlined above. In FIG. 2, one entry is shown in the C/I matrix 50 for the C/I value for the cell site 9. In other words, the site 9 is treated as the phantom site and its interference with site 21 is measured by the ratio $$\left(\frac{C_{21}}{I_9}\right)$$

in FIG. 2. In a C/I ratio, the numerator is the signal strength (of the phantom channel or frequency) measured in the current cell site (e.g., the cell site 21 in FIG. 2) and the denominator is the signal strength of the phantom frequency measured in the phantom site itself (e.g., the cell site 9 in FIG. 2); both of these frequencies are measured by mobile phones 22, 23 operating in the respective cell sites.

The process of C/I matrix determination according to the present invention has several advantages in comparison with other techniques for obtaining an interference matrix. Some examples include: (1) The process according to the present invention eliminates or minimizes the need for drive testing because it uses customers' mobile phones to report back the C/I relationships; (2) the process is automatically traffic-weighted because it reports the C/I from wherever the users are; and (3) the process is downlink-based in comparison with switch vendor-based systems that provide C/I statistics with mainly uplink-based signal measurements.

Figure 3:
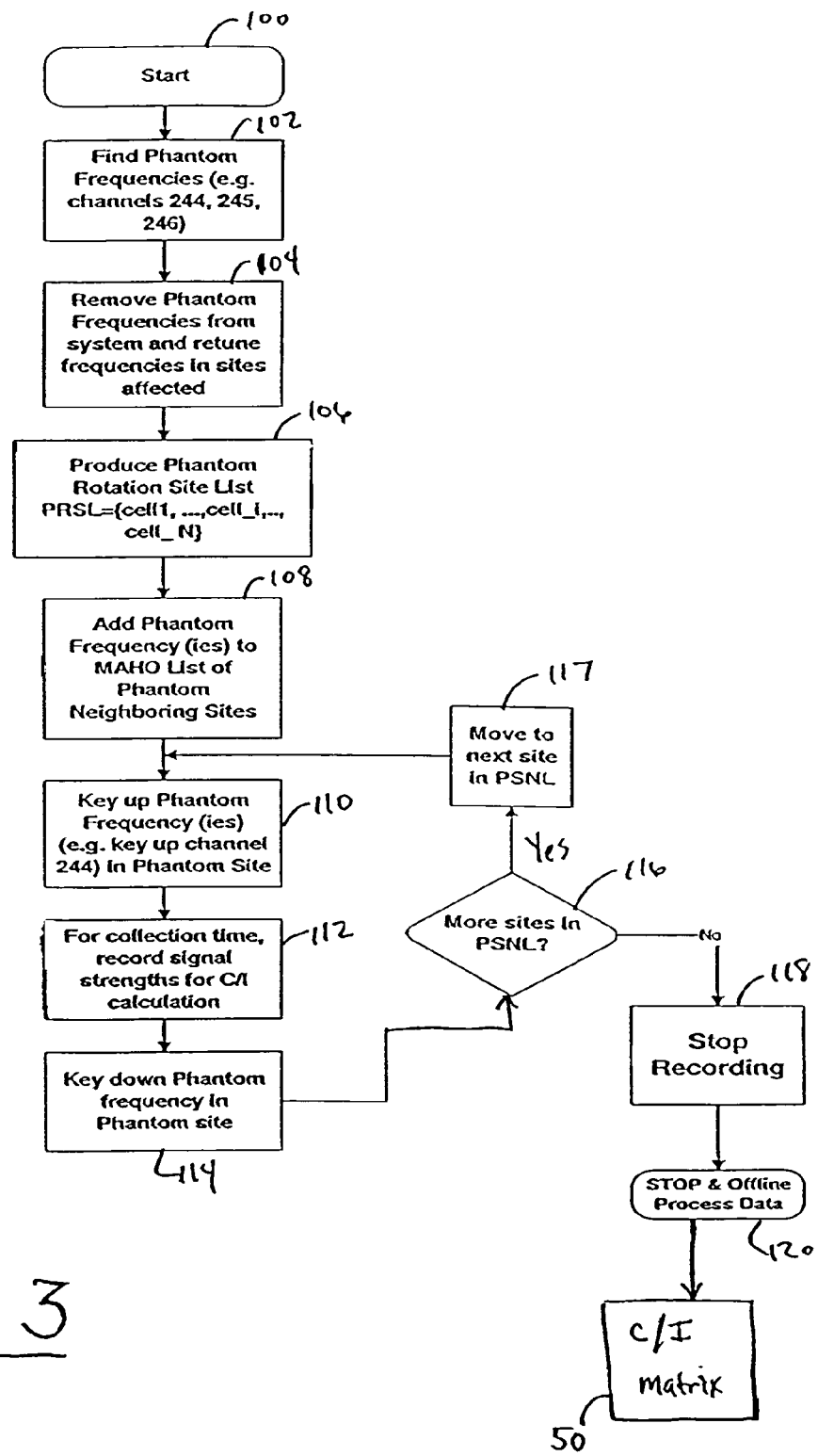
FIG. 3 illustrates a simplified flowchart for the process of interference matrix generation according to one embodiment of the present invention.

FIG. 3 illustrates a simplified flowchart for the process of interference matrix 50 generation according to one embodiment of the present invention. The process starts at start block 100. At step 102 a unique frequency (or channel) (i.e. the phantom frequency) that can be used as a beacon channel in the phantom sites is found. This channel along with lower and upper channels are carved off from the entire system at step 104 so that a sector can be uniquely identified by keying up the phantom channel. Also, at step 104 the phantom channel is retuned to minimize blocking. The phantom channel may be selected to be the least used digital channel in the system. In other words, a least-used channel may be identified as a channel that may be removed from the system along with its co-channels requiring the least amount of work (e.g., system retuning) and the least blocking impact. Because TDMA mobile stations have poor adjacent channel rejection, it may be necessary (in a TDMA system, for example) to also carve the two channels adjacent to the phantom channel. One way to do this is to calculate the three consecutive channels that are used least in the system. Alternatively, if the cellular region has a guard channel, the channels next to the guard channel can be retuned. However the channels are chosen, the end goal is the same: to find a unique frequency (phantom channel) that can be used as a beacon.

After the "protected" channel is found, it must be removed from the system along with any adjacent channels. The intent of the removal is to minimize blocking on the desired frequency. The "protected" channel can be placed on various cells throughout the system.

Next, a list of all sites in which the phantom frequency can be placed is produced at step 106. For example, the phantom frequency chosen may not satisfy the combiner spacing in some sites. In that case, it may not be possible to rotate the particular phantom frequency in these sites, and in such cases another phantom frequency is needed.

Next, the phantom frequency is added to the MAHO list of all the sites in the system at step 108. These sites may be called the phantom neighboring sites. Thereafter, the following loop may be performed: (1) Key up the phantom channel in the phantom site at step 110. It is noted that the same number (e.g., channel 244) of phantom channels may not work for every sector in the system. In that case, the earlier phantom channel may be changed and an appropriate new channel may be turned on for that phantom site; (2) For a specified collection time, for every mobile in the system, record the signal strength of the phantom channel in the serving site (i.e., one of the phantom neighboring sites) and that in the phantom site at step 112. The ratio of these two signal strengths is the C/I as mentioned hereinbefore. Some statistical interpretation will be needed to evaluate if enough data have been collected for each sector, depending on its normal traffic load; (3) Key down the phantom frequency in the phantom site at step 114; and (4) If there are more sites in the phantom neighboring sites list (PSNL) as determined at step 116, move to the next site in the PSNL at step 117 and start the process again until all desired sectors have been evaluated.

When no more sites are left in the PSNL as determined at step 116, the signal strength recording process outlined hereinabove is stopped at step 118. The post-processing of this data at step 120 shows the C/I distribution for every cell pair in the system.

It is noted that if the designer wants to block one or more channels (as phantom channels) for a test (e.g., channel $f_2$ for site #1, channel $f_{10}$ for site #2, etc.), field technicians may not necessarily be cognizant that the designer is doing a test. Therefore, the field technicians may put the "blocked" or "reserved" channels back into service and that may ruin the test. One way to overcome this problem is to "invent" new voice channel groups that do not actually exist, and when the designer determines the channels that need to be blocked, the designer may reassign these voice channel groups to corresponding channels to be blocked, thus preventing the channels from taking commercial traffic. In this manner, the channels can be placed out of service during testing. Such an arrangement is not vendor-specific in the sense that it can be applied to any switch (i.e., the MSC 24) from any vendor that uses, for example, voice channel groups or sequencing groups. In one embodiment, a channel sequencing group may be created that is not actually attributed to any cell site. All sites have certain codes, i.e., the parameters that define the order, such as from voice channel group 1 to voice channel group 8, or from 8 to 1, or any order such as that. However, the sites may not have order "X," which is what the designer can assign as a channel sequencing group. The designer can give a voice channel group (e.g., a phantom group) that isn't in the hunt sequence. The site thus will not assign those voice channels to any commercial traffic. Each sector in a cell site (e.g., there may be three sectors in a cell site when the cell antenna coverage spans three sides or regions within the cell) may have its own hunt list. The hunt list (at the MSC) may contain a sequence of channels that could be assigned to new calls in the corresponding sector. The switch or MSC 24 may be mapped to each sector handled by that switch. Thus, the designer can put the channels to be blocked into a hunt list that is not mapped to any sector and the field technicians may not find the problem with the system. The new hunt list may be transparent to them.

The phantom frequency is added to the neighbor list in the corresponding MSC 24 at step 108. The switch-based neighbor list, for the most part, has a lot of capacity, and many times only twelve channels in the neighbor list are used. However, the designer can add up to twenty-four channels. Because the designer is really only adding (to the neighbor list) one channel with the phantom site, there is no problem with that addition. In one embodiment, with only one phantom frequency, the designer may be able to obtain C/I data for only three sites a day. There may be thousands of sectors in a given cellular network and it may take many months to completely evaluate the C/I matrix. However, with multiple frequencies going up in different sectors, the designer can perform faster data collection. For example, simultaneous testing (e.g. in two sectors) could be done with the same phantom frequency if two sectors are far apart. In one embodiment, the designer can assign the phantom channel in the neighbor list on a global basis (i.e., across all sites in the system) with, for example, an Ericsson switch.

At step 108, it is also determined if the maximum length of neighbors in the neighbor list is exceeded. If so, a neighbor (e.g. a secondary neighbor) may be removed from the list.

Once the neighbor list is updated at step 108, the phantom frequency is keyed up at step 110. "Key up" means turn on or power up. Once the unique frequency on the phantom site is powered up, every cell site will start to "see" (or detect) it. Also, all the mobiles (i.e., mobile phones or cell phones) in the entire network will start to detect the phantom frequency. If the mobiles are too far away, they will record a minimal amount of the phantom frequency's signal strength and send back the recorded data to the corresponding cell site (and, hence, eventually to the respective switch or MSC) indicating that the mobiles are far away. The mobiles just measure the signal strength and do not have to perform any computations. The present invention uses a switch-based interference matrix generation scheme where the system (i.e., the switch, with the help of the mobiles operating in the network) itself measures the quality or relational quality between two sectors in the mobile network.

The designer may perform the data collection using the computer 26 at, for example, a fixed time (or times) during each day to minimally burden the switch traffic. The customers' cell phones report back (to the corresponding cell site) the signal strengths for each of the frequencies. The switch may be programmed to retrieve the signal strength data to compute C/I matrix entries. The switch may retrieve the MAHO data for the corresponding site. The C/I matrix may be ascertained in a row-by-row manner if there is only one phantom frequency. However, if more than one phantom frequency is employed, then the row and column data for the C/I matrix may be determined simultaneously. In one embodiment, interference is measure from every sector in the system to every other sector in the system. It is noted, however, that the C/I matrix is not symmetrical. In other words, for example, the interference measured from a first cell into a second cell may not be identical to that measured from the second cell into the first cell. In one embodiment, the designer may determine the threshold for frequency reuse to be 17 dB. Thus, if a particular C/I ratio is greater than or equal to 17 dB, then the corresponding cell sites may be selected for frequency reuse. However, it is noted that there may be some additional restrictions on the frequency reuse determination. For example, sectors that are hand-off neighbors may not be selected for frequency re-use. Also, there may be some interference-based rules (selected by the system designer or mobile service provider) that prevent certain cells from having the reuse frequencies. Also, there may be some rules governing the spacing between two frequencies. In that case, the reuse determination may have to change in view of the spacing between neighboring frequencies. The present invention uses signal strengths measured by mobiles to determine a global interference matrix for the entire cellular network.

With the present switch designs, the MAHO data (at the switch) can only be accessed if the mobile is actually doing a hand-off while moving from one sector to another sector. If there is no hand-off request, then no signal strength reading can be obtained. For example, no MAHO measurements can be obtained from non-handoff regions between two cell sites. However, in one embodiment of the present invention, the hand-off operation can be "faked" with phantom trigger sites, thereby forcing the system to always be in the hand-off mode until changed back to normal operation. One of the ways to perform this is to use parameters to specify the extreme amount of negative histories for the phantom site. However, some switches (e.g., Ericsson switches) have a hard-coded maximum negative histories value that can be used. Even though the amount that should be enough may be specified to a certain extent, that amount still has a finite limit. If a site gets further and further away from a phantom site and won't produce triggers very often, the designer may still need to have those readings even if they are indicators of minimal signal reception. Those readings may not be obtainable. One way to overcome that is to develop phantom trigger sites (or "trigger sites") in the network which use existing control channels or set-up channels in all of the neighboring sites. This results in having two sites (the phantom site and the phantom trigger site)—i.e., two phantom sites within the neighbor list of all the remaining sites for which C/I determinations are to be made. Each relevant neighbor list thus contains in it the phantom site and the trigger site. The trigger site uses the control channel as the measurement channel of the site that the designer is recording the signal strengths from and the negative histories may be put at the end. The phantom trigger site may be just for the triggers. The designer may not be interested in the readings that the designer gets from negative histories. It may only be desirable to get the triggers, and, there may be a hand-off request, e.g. every three seconds, for all mobiles being served in that site.

A mobile triggers for hand-off when the mobile is moving from one sector into another sector. When the power in the sector that the mobile is moving towards becomes significantly greater than the power the mobile is currently being served on, the hand-off is triggered. Thus, as the mobile is moving, a hand-off boundary appears. The mobile triggers for hand-off close to a region in the vicinity of the hand-off boundary because that may be the only time that the sector the mobile is moving towards is significantly "hotter," or stronger, (in signal strength) in comparison. In one embodiment of the present invention, a trigger frequency (from the trigger site) may be forced into the hand-off region (i.e., the determinable region around the hand-off boundary). The trigger frequency may be placed in the appropriate MAHO list. It is noted that the trigger frequency may be coming from the same antenna that the mobile is being served on. The designer can set the history to zero so that the mobile will always try to trigger at the trigger frequency even though there is no actual additional site present there. Thus, another frequency (i.e., the trigger frequency) is simply added. The trigger frequency may actually already be present at the trigger site. For example, the designer may just pick one of the frequencies in the serving sector that happens to be the control channel and therefore the mobile will try to hand-off to it and then the designer can collect the measurements.

The foregoing describes one way to overcome any limitation as to when one can actually get access to the MAHO measurements. In prior systems, one can get measurements only during actual handoffs and only near handoff boundaries. However, with the present invention, one can get measurements in a larger coverage area. With the present invention, approximately 900 to 1200 measurements per hour can be made, for example, with forced triggers every three seconds. Thus, handoff triggers may be forced, or "faked," to collect the measurements. Such a scheme of forced triggers may be better than, for example, triggering in GSM where just normal hand-off triggers occur in the hand-off boundaries because under the present invention forced triggers constantly allow for obtaining readings from the cell sites no matter where a mobile is. However, it is noted that the scheme of forced triggers may not be needed if a switch manufacturer allows access (at the switch level) to the MAHO measurements all the time because the mobile is constantly sending MAHO measurements to the respective cell site as long as the mobile is on call, but the cell site does not send a MAHO measurement to the switch unless the mobile is in an actual hand-off situation. That is, the cell site does not report all the MAHO measurements back to the switch unless there is a qualifier. Forced triggering makes cell sites "believe" that the cell sites are qualified to send all MAHO measurements to the switch. Thus, if a switch vendor designs the switch such that the MAHO data to the cell sites are also sent to the switch, then forced triggering may not be needed.

As shown in FIG. 3, the final stage of interference matrix generation is offline processing of the signal strength data collected. The offline processing may be done with the help of a computer program resident on the computer 26 on, for example, a computer-readable medium. The software at step 120 is designed to implement features of the present invention and is in communication with the MSC or switch 24. The data are collected at the switch 24, and the program interfaces with the switch 24 to retrieve the collected data. Thus, first the phantom frequency is found, then it is removed from the entire system, then it is keyed up on a site-by-site basis, then data collection takes place, and finally the computations are performed (off line) on the collected data. All these stages may be controlled with the help of the offline computer program. The software may instruct the switch 24 to measure the phantom frequency and to instruct all the mobiles in the system to measure it as well. The software may then instruct the switch to key down the phantom frequency in the current site and move it to the next site and again collect the data. This process may be repeated for each site in the system 10.

The quality of the C/I matrix generated from using one or more phantom frequencies globally across the entire system is better than the quality of prior art methods to generate the C/I matrix. With the use of a phantom frequency, the system designer or test engineer is able to capture signal strength data from almost any location in the system 10, i.e., whether a mobile user is inside of a restaurant or building, in a house, running around in a back yard, at places one cannot reach by driving, etc. Thus, the measurements are actually weighted by where the cellular service provider's customers are. If a customer is driving on a road, the measurements from that customer's cell phone are equally weighted over the roads that the customer travels. Over ninety-percent of actual cell phone usage may be covered (for testing) when the signal strength threshold is set at around 17 dB (which was mentioned hereinbefore) and measurements are collected from the switch.

One application of the use of phantom frequency-based signal strength data collection (and, hence, C/I matrix generation) includes assisting performance engineers to devise efficient frequency planning for the entire cellular system. In another application, a phantom frequency-based testing may be conducted at sub-site level when a customer complains about poor signal quality. The results may be quantified and signal interference problems may be remedied. That does not necessarily mean that all signal interference across the entire system may be controlled at all times. However, with the phantom frequency-based testing, the interference problems may be easily and more accurately quantified, some weighted decisions may be made, and the problems may be thereafter optimally remedied.

The phantom frequency-based site interference determination methodology of the present invention is also useful when a new site is added to the system 10. With the drive test method, the test engineer may have to drive the entire system to figure out the interference of the newly-added site with every other site in the system. Drive testing of the entire system whenever any site is added is not only time consuming, but extremely inefficient. With the present invention, when a new site is added, the test engineer can key up the unique phantom frequency in the added site and then measure the interference from the new site to all other sites in the system (i.e., the "from-to" measurement). However, as noted hereinabove, the interference measurements are not symmetrical. That is, the "to-from" measurement (i.e., interference from other sites in the system to the newly added site) may not be identical to or be derived from the "from-to" measurement. One approach for the "to-from" measurement is to perform phantom frequency testing from all the remaining sites. However, that may not be an efficient solution whenever a new site is added. In such a situation, the drive test may be utilized in a selective manner in conjunction with the phantom frequency-based testing methodology of the present invention. In other words, the drive test may need to be performed only in the territory of the newly-added site to measure interference from all the other sites in the system. A new phantom frequency may be keyed up, sequentially, in each of the other sites, and the drive test may be performed throughout the territory of the newly-added site for each corresponding remaining site in the system. In another application, the principles of phantom frequency-based testing in conjunction with drive testing may be used when a cell type or configuration is changed (e.g., when the transmitting power of a cell is changed, or the orientation of cell antennas is changed), because such a configuration change is, in principle, similar to adding a new site. The requisite testing can be done beforehand to determine the financial cost or coverage impact (e.g., resulting interference with other sites) of the configuration change. Thus, the present invention helps in such incremental site additions or site modifications in the system. On the other hand, the entire interference determination based only on the drive testing may take months to complete. However, it may be helpful to employ the drive test either alone or in conjunction with the phantom frequency-based testing in the event that a quick retune of the system is to be performed.

In a drive test, a measurement tool/box or scanning equipment may be carried in an automobile to drive around the physical territories of the cell sites to scan the entire spectrum of cellular frequencies and then to decode the signal strength (of each cellular frequency in the service provider's system) and each base station ID. The base station ID's are transmitted on the corresponding channels themselves. Therefore, the engineer performing the drive test is able to figure out where (i.e., from which base station) the power came from on a given frequency. Thus, the entire frequency spectrum is scanned for each cell sector in the system. On each frequency, the measurement tool records the base stations the tool "sees." The drive test can be performed in real time, i.e., without shutting down the network traffic in one or more sectors during testing.

The drive test can decode only one base station at a time. It is noted that when there are two base stations equidistant from the measurement tool/box used for the drive test, the signals from those two base stations may cancel out each other (i.e., the ratio C/I in that situation is zero) and the measurement tool may not be able to decode the base station ID's for those two stations. According to one embodiment of the present invention, this problem may be solved by replacing the omnidirectional antenna on the measurement tool/box used for drive test with a directional antenna having the same gain in all directions. The directional antenna still has the same gain in all directions, but it is able to distinguish between signals coming from one direction versus those coming from another direction. The omnidirectional antenna may fail to distinguish signals in the situations described hereinabove.

The present invention relates to the use of phantom sites (in the downlink manner) to generate a switch-based interference matrix. However, as noted hereinbefore, some other schemes for generating a switch-based interference matrix include propagation tools and drive testing. Using propagation tools may be the easiest to implement because almost all the tasks can be performed remotely from a computer. However, the results obtained from the propagation tools may be error prone. On the other hand, drive testing may be difficult and may take a very long time to finish, especially when there are multiple sites to cover over a wide geographic region. The phantom sites approach according to the present invention may take some time to cycle through or rotate the phantom frequency (and, hence, perform the measurements) among all the cell sites, but it produces a more accurate C/I interference matrix because of the weighted measurements performed with the help of actual cell phones in the network.

The present invention uses switch data in ways that are unique, efficient, and accurate. The process according to the present invention can be used in any technology in which a wireless device such as mobile phone (or cellular phone) returns signal strengths and other pertinent information to the switch that can be used to identify cell sites uniquely. For example, in TDMA (Time Division Multiple Access), GSM (Global System for Mobile Communications), and EDGE (Enhanced Data-rates for GSM Evolution), MAHO (Mobile Assisted Handoff) or reselection readings are used. In CDMA (Code Division Multiple Access) systems, mobiles (i.e., cellular phones) return pilot signal strengths for handoff candidates and the data about pilot signal strengths may then be used for C/I computations.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method comprising:
   selecting a frequency to be used as a phantom frequency based in part on an amount of traffic carried by the frequency across a plurality of cell sites;
   designating a cell site of the plurality of cell sites to be a phantom site;
   activating the phantom frequency at the phantom site;
   receiving a first signal strength of the phantom frequency measured at a first mobile device located within the phantom site;
   receiving a second signal strength of the phantom frequency measured at a second mobile device located within a disparate cell site of the plurality of cell sites; and
   compiling an interference mapping matrix based in part on a ratio of the second signal strength to the first signal strength.

2. The method of claim 1, wherein the selecting includes selecting the frequency based in part on an amount of retuning that is to be performed for removing the frequency from a communication network.

3. The method of claim 1, further comprising, redesignating another of the plurality of cell sites to be the phantom site.

4. The method of claim 3, further comprising, repeating the activating, receiving the first signal strength, receiving the second signal strength, compiling and redesignating until each of the plurality of cell sites is designated as the phantom site in turn.

5. The method of claim 1, wherein the selecting includes selecting the frequency based in part on an amount of blocking impact that is employed for removing the frequency from a communication network.

6. The method of claim 1, further comprising, adding the frequency to a hunt list that is not utilized by sectors of the plurality of cell sites.

7. The method of claim 1, further comprising, removing a channel associated with the phantom frequency from the wireless communication system.

8. The method of claim 7, further comprising, removing at least one disparate channel adjacent to the channel from the wireless communication system.

9. The method of claim 1, further comprising, adding the phantom frequency to mobile assisted handoff lists of the plurality of phantom neighboring cell sites.

10. The method of claim 1, further comprising, simultaneously testing two or more sectors with the phantom frequency.

11. The method of claim 1, further comprising, employing a phantom trigger site that forces a trigger to collect mobile assisted handoff measurements.

12. A system comprising:
    a telecommunication switch configured to select a phantom frequency based in part on an amount of traffic carried across a plurality of cell sites by the phantom frequency, and configured to activate the phantom frequency at a phantom site, wherein the phantom site is one of the plurality of cell sites; and
    a computing device configured to generate an interference mapping matrix based in part on a ratio of a first phantom signal strength, measured by a first cellular device located within the phantom site, and a second phantom signal strength, measured by a second cellular device located within a disparate site adjacent to the phantom site.

13. The system of claim 12, wherein the first phantom signal strength and the second phantom signal strength are recorded.

14. The system of claim 12, wherein the telecommunication switch is further configured to select another of the plurality of cell sites as a next phantom site.

15. The system of claim 14, wherein the telecommunication switch is further configured to activate the phantom frequency at the next phantom site and receive signal strengths at the next phantom site until each of the plurality of cell sites is designated as the next phantom site in turn.

16. The system of claim 15, wherein the computing device is further configured to calculate the interference mapping matrix based in part on the signal strengths.

17. The system of claim 12, wherein the telecommunication switch is further configured to collect the first phantom signal strength and the second phantom signal strength via a mobile assisted handoff list.

18. A non-transitory computer readable storage medium comprising computer-executable instructions that, in response to execution, cause a system to perform operations, comprising:

determining a phantom frequency based in part on an amount of traffic carried by the phantom frequency across a plurality of cell sites;

designating a cell site of the plurality of cell sites as a phantom site, wherein the phantom frequency is activated at the phantom site;

obtaining a first phantom signal strength measured at a first location within the phantom site;

obtaining a second phantom signal strength measured at a second location within one of a plurality of cell sites neighboring the phantom site; and determining an interference mapping matrix based in part on a ratio of the second phantom signal strength and the first phantom signal strength.

19. The non-transitory computer readable storage medium of claim 18, the operations further comprising, redesignating, in turn, each of the plurality of cell sites as a next phantom site.

20. The non-transitory computer readable storage medium of claim 19, the operations further comprising:

activating the phantom frequency at the next phantom site;

collecting a third phantom signal strength measured at a third location within the next phantom site and a fourth phantom signal strength measured at a second location within one a disparate cell site; and calculating the interference mapping matrix based on the third phantom signal strength and the fourth phantom signal strength.

\* \* \* \* \*